(12) United States Patent
Debnath et al.

(10) Patent No.: US 11,574,461 B2
(45) Date of Patent: Feb. 7, 2023

(54) TIME-SERIES BASED ANALYTICS USING VIDEO STREAMS

(71) Applicant: NEC Laboratories America, Inc., Princeton, NJ (US)

(72) Inventors: Biplob Debnath, Princeton, NJ (US); Srimat Chakradhar, Manalapan, NJ (US); M. Ashraf Siddiquee, Albuquerque, NM (US)

(73) Assignee: NEC Corporation

( * ) Notice: Subject to any disclaimer, the term of this patent is extended or adjusted under 35 U.S.C. 154(b) by 43 days.

(21) Appl. No.: 17/197,403

(22) Filed: Mar. 10, 2021

(65) Prior Publication Data
US 2021/0312773 A1 Oct. 7, 2021

Related U.S. Application Data (60) Provisional application No. 63/006,246, filed on Apr. 7, 2020.

(51) Int. Cl.
*G06V 10/74* (2022.01)
*G06F 16/783* (2019.01)
(Continued)

(52) U.S. Cl.
CPC ........ *G06V 10/761* (2022.01); *G06F 16/7837* (2019.01); *G06F 16/7867* (2019.01); *G06V 20/46* (2022.01); *G06V 20/44* (2022.01)

(58) Field of Classification Search
CPC ........ G08B 13/19606; G08B 13/19673; G08B 23/00; G08B 13/19641; G08B 13/19608; G06F 16/7837; G06F 16/7867; G06F 16/78; G06V 20/46; G06V 20/44; G06V 10/761; G06V 20/48; G06V 20/52
(Continued)

(56) References Cited

U.S. PATENT DOCUMENTS 8,112,425 B2 2/2012 Baum et al.
8,219,574 B2 7/2012 Liu et al.
(Continued)

FOREIGN PATENT DOCUMENTS

JP 2015170874 A 9/2015
WO WO-2010111748 A1 * 10/2010 ......... G06K 9/00771

OTHER PUBLICATIONS

Keogh, E., "The UCR Matrix Profile Page", University of California—Riverside. Saatavissa: https://www.cs.ucr.edu/~eamonn/MatrixProfile.html. Sep. 2019, pp. 1-5.
(Continued)

*Primary Examiner* — Amandeep Saini
(74) *Attorney, Agent, or Firm* — Joseph Kolodka (57) ABSTRACT

Methods and systems for detecting and predicting anomalies include processing frames of a video stream to determine values of a feature corresponding to each frame. A feature time series is generated that corresponds to values of the identified feature over time. A matrix profile is generated that identifies similarities of sub-sequences of the time series to other sub-sequences of the feature time series. An anomaly is detected by determining that a value of the matrix profile exceeds a threshold value. An automatic action is performed responsive to the detected anomaly.

14 Claims, 6 Drawing Sheets

(51) Int. Cl.
  *G06F 16/78* (2019.01)
  *G06V 20/40* (2022.01)
(58) Field of Classification Search
  USPC .......................................................... 382/103
  See application file for complete search history.

(56) References Cited

U.S. PATENT DOCUMENTS

| | | |
|---|---|---|
| 8,682,816 B2 | 3/2014 | Ruhl et al. |
| 9,578,046 B2 | 2/2017 | Baker |
| 2017/0026250 A1* | 1/2017 | Hu ........................ H04L 41/147 |
| 2017/0139558 A1 | 5/2017 | Cervelli et al. |
| 2020/0298368 A1* | 9/2020 | Osterheld .............. G06N 3/084 |

OTHER PUBLICATIONS

Keogh, E., "The First Matrix Profile Tutorial—Part 1: Time Series Data Mining Using the Matrix Profile: A Unifying View of Motif Discovery, Anomaly Detection, Segmentation, Classification, Clustering and Similarity Joins", University of California—Riverside. Saatavissa: https://www.cs.ucr.edu/~eamonn/MatrixProfile.html. Sep. 2019, pp. 1-110.

Keogh, E., "The First Matrix Profile Tutorial—Part 2: Coffee Break", University of California-Riverside. Saatavissa: https://www.cs.ucr.edu/~eamonn/MatrixProfile.html. Sep. 2019, pp. 1-65.

\* cited by examiner

TIME-SERIES BASED ANALYTICS USING VIDEO STREAMS

RELATED APPLICATION INFORMATION

This application claims priority to U.S. Patent Application No. 63/006,246, filed on Apr. 7, 2020, incorporated herein by reference in its entirety.

BACKGROUND

Technical Field

The present invention relates to video analysis, and, more particularly, to the use of video streams to generate time series data that can be used with time series analytics.

Description of the Related Art

Deep learning-based computer vision technologies are becoming increasingly common, with video cameras being deployed widely and in many different contexts. This provides a wealth of information about user activities. However, a number of existing types of analytics cannot be used directly on video stream data.

SUMMARY

A method for detecting and responding to an anomaly includes processing frames of a video stream to determine values of a feature corresponding to each frame. A feature time series is generated that corresponds to values of the identified feature over time. A matrix profile is generated that identifies similarities of sub-sequences of the time series to other sub-sequences of the feature time series. An anomaly is detected by determining that a value of the matrix profile exceeds a threshold value. An automatic action is performed responsive to the detected anomaly.

A method for predicting an anomaly includes generating a time series, based on frames of a video stream. A matrix profile is determined, based on the time series, that identifies similarities of sub-sequences of the time series to other sub-sequences of the time series. An anomaly is detected by determining that a value of the matrix profile exceeds a threshold value. An anomaly precursor is identified that includes a pattern from the time series occurring before the detected anomaly. The anomaly precursor is detected in a newly received sub-sequence of the time series to predict an anomaly, by matching the identified anomaly precursor to the newly received sub-sequence. An automatic action is performed to prevent the predicted anomaly.

A system for detecting and responding to an anomaly includes a hardware processor and a memory that stores a computer program product. When the computer program product is executed by a computer, it causes the hardware processor to process frames of a video stream to determine values of a feature corresponding to each frame, to generate a feature time series that corresponds to values of the identified feature over time, to determine a matrix profile that identifies similarities of sub-sequences of the time series to other sub-sequences of the feature time series, to detect an anomaly by determining that a value of the matrix profile exceeds a threshold value, and to perform an automatic action responsive to the detected anomaly.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Video stream information may be converted to time series data, where a measurement is extracted from the successive images of the video stream over a period of time. This time series data can then be analyzed using a matrix profile for the performance of an analysis. The matrix profile helps to identify periods of normal behavior and periods of anomalous behavior, which a system can then use to automatically respond to changing circumstances.

Figure 1:
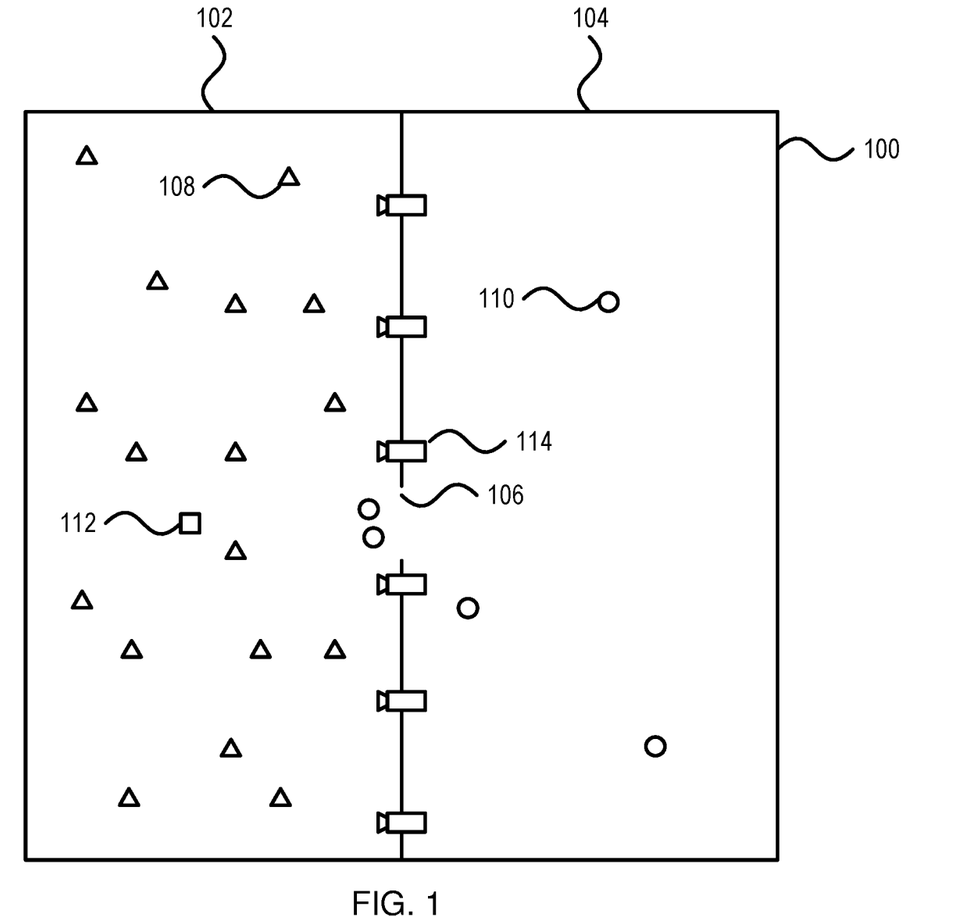
FIG. 1 is a diagram of an environment that is monitored by various video streams, where anomalous behavior may be detected from time series information generated by the time series, in accordance with an embodiment of the present invention.

Referring now in detail to the figures in which like numerals represent the same or similar elements and initially to FIG. 1, an environment 100 is shown. For example, one type of environment that is contemplated is a mall or shopping center, which may include a common space 102 and one or more regions 104, such as a store. It should be understood that this example is provided solely for the purpose of illustration, and should not be regarded as limiting.

A boundary is shown between the common space 102 and the region 104. The boundary can be any appropriate physical or virtual boundary. Examples of physical boundaries include walls and rope—anything that establishes a physical barrier to passage from one region to the other. Examples of virtual boundaries include a painted line and a designation within a map of the environment 100. Virtual boundaries do not establish a physical barrier to movement, but can nonetheless be used to identify regions within the environment. For example, a region of interest may be established next to an exhibit or display, and can be used to indicate people's interest in that display. A gate 106 is shown as a passageway through the boundary, where individuals are permitted to pass between the common space 102 and the region 104.

The environment 100 is monitored by a number of video cameras 114. Although this embodiment shows the cameras 114 being positioned at the gate 106 and along a border between regions, it should be understood that such cameras can be positioned anywhere within the common space 102 and the region 104. The video cameras 114 capture live streaming video of the individuals in the environment. A number of individuals are shown, including untracked individuals 108, shown as triangles, and tracked individuals 110, shown as circles. Also shown is a tracked person of interest 112, shown as a square. In some examples, all of the individuals may be tracked individuals.

In addition to capturing visual information, the cameras 114 may capture other types of data. For example, the cameras 114 may be equipped with infrared sensors that can read the body temperature of an individual. In association with the visual information, this can provide the ability to remotely identify individuals who are sick, and to track their motion through the environment.

As a tracked individual 110 moves through the environment 100, they may move out of the visual field of one video camera 114 and into the visual field of another video camera. The tracked individual 110 may furthermore enter a region that is not covered by the visual field of any of the video cameras 114. Additionally, as the tracked individual 110 moves, a camera's view of their face may become obstructed by clothing, objects, or other people. The different images of the tracked individual's face, across time and space, associated together to links videos of individuals in different places and at different times.

During operation, each of the cameras 114 may generate a respective video stream. These video streams may be processed, and the frames of the respective video streams may be analyzed. For example, each frame may be processed to identify people, faces, vehicles, or any other form of object. Such processing may include object localization, where a bounding box may be established around a detected object. The video streams may also indicate particular events, such as the detection of motion, a change in an environmental condition such as lights being turned on, or the occurrence of particular temperature conditions using infrared cameras. Each frame may be timestamped, so that the time of each occurrence, event, or detection may be identified and tracked.

In one example, a particular camera 114 may overlook a specific gate 106, where people continually pass through. The video stream that is generated by the camera 114 may be processed to determine how many people are detected in each frame. In this manner, the number of people passing through the gate 106 may be determined as a function of time. Additional processing may be performed, for example by tracking information from frame to frame. An example of such additional processing may be to keep track of faces or other identifying information as people pass by, making it possible to determine a number of unique individuals who have passed through the gate 106.

Figure 2:
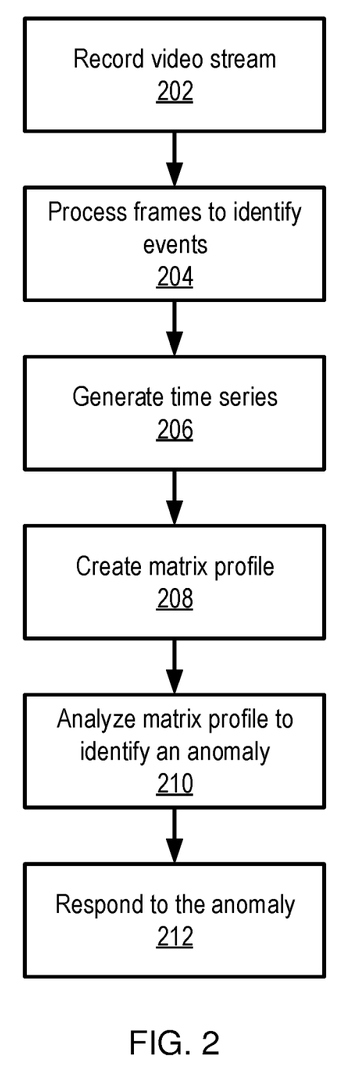
FIG. 2 is a block/flow diagram of a method of detecting and responding to an anomaly in video time series information, in accordance with an embodiment of the present invention.

Referring now to FIG. 2, a method of detecting and responding to anomalies in video streams is shown. Block 202 records a video stream from a camera 114. This video stream may include a series of individual image frames, and may further include additional information, such as metadata and sensor measurements. Each frame may be associated with a respective timestamp, indicating a time at which the image was captured and providing an order between the frames of the video stream.

Block 204 processes the individual frames of the video stream. This processing may include, for example, detecting objects within the frames, identifying bounding boxes of detected objects, inferring interactions between objects in the frames based on relative positions, detecting the occurrence of an event, correlating multiple events, etc. The processing may provide a set of features that are associated with each frame, such as with a binary-valued, continuously-valued, or mixed-valued feature vector, with each element of the feature vector representing the occurrence of a respective event. For example, the processing may determine whether a person is present in a frame, how many people are detected within the frame, a maximum body temperature of the people detected in the frame, whether a person is within a particular region of interest in the frame, or any other feature or combination of features.

Block 206 generates a time series, based on the feature(s) detected in the individual frames of the video stream. For example, one time series may track times at which a person has been detected. Another time series may include a time series may track how many people are detected within the video stream over time. Because each frame may have a respective time stamp, these occurrences may be ordered in time. Multiple time series may be generated for each video stream in this manner, representing different types of processing that were performed.

Using the time series, block 208 creates a matrix profile. A matrix profile may annotate the time series to identify patterns. In one sense, a matrix profile may represent a distance matrix of all pairs of subsequences of length m within the time series. The different values of the matrix may then represent the similarity of a given subsequence to the other subsequences in the time series, with a smallest non-diagonal value indicating whether a given subsequence has occurred before. Any appropriate similarity metric may be used to generate a value that reflects the similarity of two time series sub-sequences. Thus, the matrix profile may generate relatively flow values at times when the time series is acting in a manner that reoccurs, and have relatively high values during anomalous times.

Using the matrix profile, block 210 identifies anomalies, for example by identifying timestamps at which the matrix profile exceeds a threshold value. Such high values represent subsequences of the time series that have a relatively unique shape, indicating behavior that is out of the norm. For example, if a given video stream includes frames of people entering a door during particular times of the day, anomalous behavior might include a person entering the door at an unusual time of day. The matrix profile thereby captures contextual information, beyond just the singular occurrence of an event within a video frame, to distinctly identify anomalous behavior.

Block 212 then responds to the identified anomaly. This response may include referring the matter to a human operator, such as by alerting security personnel. The response may include performing an automatic action, such as locking doors, sounding an alarm, changing the operational status of one or more machines, triggering an environmental control, triggering a fire suppression system, etc.

Figure 3:
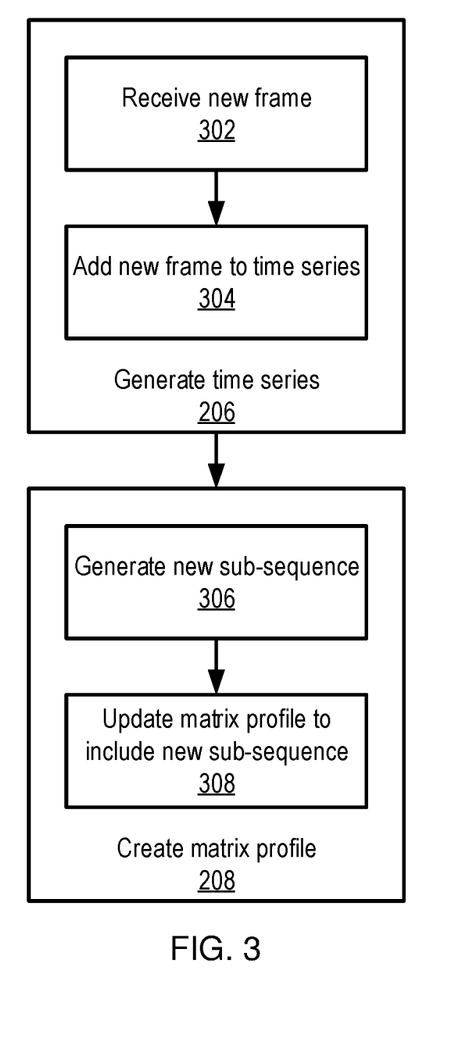
FIG. 3 is a block/flow diagram showing detail on the generation of a time series and on the creation of a matrix profile, in accordance with an embodiment of the present invention.

Referring now to FIG. 3, additional detail is provided on blocks 206 and 208. Although the process of FIG. 2 is shown as being linear, it should be understood that certain elements may be performed continuously. For example, block 202 may continuously record video stream and block 204 may continuously process incoming frames to identify events. The process of generating the time series in block 206 and creating the matrix profile in block 208 may therefore be performed iteratively, as new information comes in.

As block 204 processes the new frames of video, block 302 receives these new frames and their associated feature information. Block 304 then adds the new frame's information to the time series. If this is a new time series, then block 304 may create the first datapoint of the time series. Otherwise, the new frame may be appended to an existing time series. In the event that a frame is received out of order, block 304 may insert the new frame into the correct position in the time series, based on its timestamp.

Block 306 then generates a new sub-sequence, based on the updated time-series. This new sub-sequence may include a set of m frames, or may span a number of frames that occur within a timeframe m. Block 308 may then update the matrix profile to include the new sub-sequence, with a new value being generated that represents the similarity of the latest sub-sequence to other sub-sequences of the time series.

Figure 4:
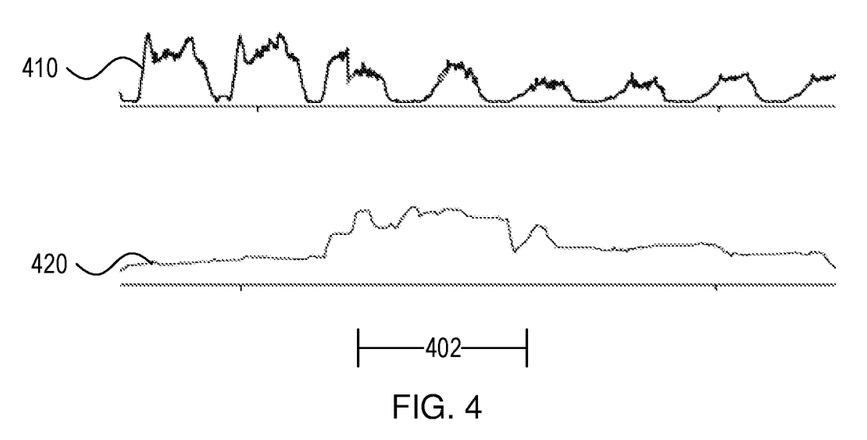
FIG. 4 is a diagram illustrating a time series and a corresponding matrix profile, in accordance with an embodiment of the present invention.

Referring now to FIG. 4, a comparison between a time series 410 and a corresponding matrix profile 420 is shown. In each graph, the horizontal axis represents time. For the time series 410, the vertical axis represents a number of object detections within a frame, such as a count of a number of people. For the matrix profile 420, the vertical axis represents the degree of similarity between a corresponding sub-sequence and other sub-sequences in the time-series.

A period of time 402 is indicated, corresponding to relatively high values of the matrix profile 420. These values correspond to a clear change in the behavior of the time series 410, where the amplitude and waveform shape changes, before settling into a new pattern. The matrix profile provides a way to automatically identify such patterns, and to do so over a much larger time scale than would be practical for a human being.

Identifying the time in which an anomaly occurs can help with identifying the root cause of a problem. For example, if a given anomaly occurs close in time to some known problem, then the corresponding video may be reviewed to identify changes in the recorded behavior that might explain the problem.

Additionally, this information may be used to predict anomalies, by identifying precursor behavior for anomalies that have been seen before.

Figure 5:
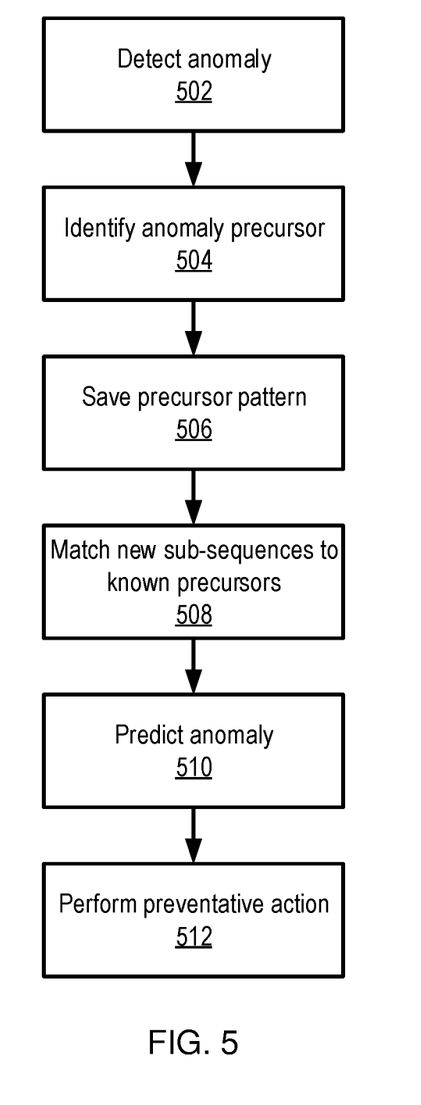
FIG. 5 is a block/flow diagram of a method of predicting and preventing an anomaly in a video time series information, in accordance with an embodiment of the present invention.

Referring now to FIG. 5, a method of anomaly prediction is shown, using anomaly precursor detection. Block 502 detects an anomaly, for example using the matrix profile described above. Block 504 then identifies an anomaly precursor. The anomaly precursor may include time series information that comes shortly before the anomaly is detected. The anomaly precursor may not itself rise to the level of being an anomaly, but may be associated with an anomaly that is about to occur. For example, as the amount of foot traffic through a region of interest is detected as being anomalous, there may be a period of increase that is below the threshold. Block 504 identifies this precursor, for example as a pattern in the time series. Block 506 saves the precursor pattern.

As the video stream continues to be monitored, the precursor pattern may be matched against new sub-sequences of the time series. This matching may include a similarity matching, where an above-threshold similarity between a saved precursor pattern and a time series sub-sequence indicates that an anomaly precursor has been detected in block 510. Any appropriate similarity metric may be used to determine a value that reflects the similarity between a precursor pattern and a time series sub-sequence. A preventative action may then be performed in block 512. The preventative action may be any appropriate action that can be used to prevent the anomaly, or to minimize its impact. For example, the preventative action may include diverting traffic, engaging or disengaging traffic control devices, sending security personnel to a region of interest, etc. The preventative action may include, for example, any action described above as a responsive action.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 6:
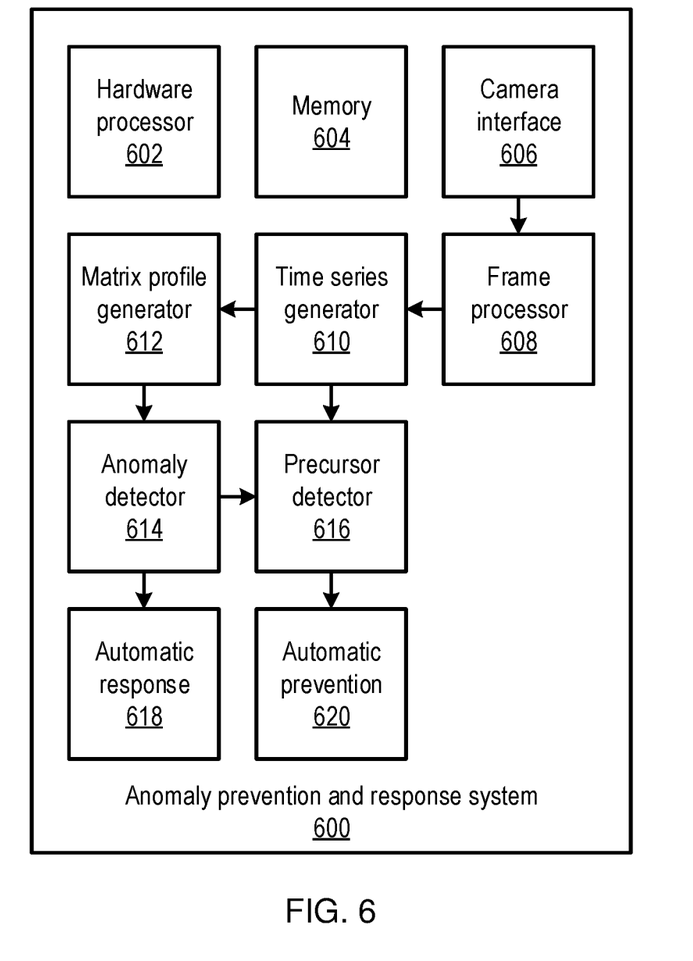
FIG. 6 is a block diagram of an anomaly prevention and response system that detects, predicts, prevents, and responds to anomalies in time series information, in accordance with an embodiment of the present invention.

Referring now to FIG. 6, an anomaly prediction and response system 600 is shown. The system 600 includes a hardware processor 602 and a memory 604. The system 600 may also include a number of functional modules that may be implemented as software, which maybe stored in the memory 604 and which may be executed by the hardware processor 602 to perform the respective function(s).

A camera interface 606 receives a video stream from one or more cameras 114. The camera interface 606 may be a dedicated analog or digital interface that received information directly from the cameras 114, or may be a network interface that receives video streams in the form of network data. The camera interface 606 may communicate with the cameras 114 by any appropriate wired or wireless communications medium and protocol.

A frame processor 608 processes the frames of the received video stream(s), for example by performing object detection or any other appropriate form of analysis. Time series generator 610 then generates a time series from the frames, representing detected features along with their respective times of detection. A matrix profile generator 612 converts the time series into a matrix profile, with a value that varies in accordance with how similar a given sub-sequence of the time series is to other sub-sequences.

Anomaly detector 614 uses the matrix profile to identify periods of anomalous activity. This triggers an automatic responsive action 618, which seeks to address the anomaly. After an anomaly has been detected, a precursor detector 616 may identify a corresponding precursor sub-sequence from the time series. As new video frames arrive and are added to the time series by time series generator 610, the precursor detector 616 identifies new sub-sequences that are similar to a previously identified precursor sub-sequence. The precursor detector 616 then triggers an automatic preventative action 620.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method of detecting and responding to an anomaly, comprising:
   processing frames of a video stream to determine values of a feature corresponding to each frame;
   generating a feature time series that corresponds to values of the identified feature over time;
   determining a matrix profile that identifies similarities of sub-sequences of the time series to other sub-sequences of the feature time series, wherein the matrix profile includes a matrix having elements that each represent a similarity between a respective pair of sub-sequences of the time series and further includes a profile time series having values that correspond to each sub-sequence of the feature time series and that are determined by the most similar other sub-sequence of the feature time series;
   detecting an anomaly by determining that a value of the matrix profile exceeds a threshold value; and
   performing an automatic action responsive to the detected anomaly.

2. The method of claim 1, wherein processing the frames of the video stream includes performing object detection.

3. The method of claim 2, wherein the feature time series includes a number of detected objects at each frame.

4. The method of claim 1, updating the feature time series and the matrix profile in response to newly received frames of the video stream.

5. The method of claim 1, wherein the automatic action includes an action selected from the group consisting of sounding an alarm, locking doors, engaging or disengaging traffic control devices, changing the operational status of one or more machines, triggering an environmental control, and triggering a fire suppression system.

6. A method of predicting an anomaly, comprising:
generating a time series, based on frames of a video stream;
determining a matrix profile, based on the time series, that identifies similarities of sub-sequences of the time series to other sub-sequences of the time series, wherein the matrix profile includes a matrix having elements that each represent a similarity between a respective pair of sub-sequences of the time series and further includes a profile time series having values that correspond to each sub-sequence of the feature time series and that are determined by the most similar other sub-sequence of the feature time series;
detecting an anomaly by determining that a value of the matrix profile exceeds a threshold value;
identifying an anomaly precursor that includes a pattern from the time series occurring before the detected anomaly;
detecting the anomaly precursor in a newly received sub-sequence of the time series to predict an anomaly, by matching the identified anomaly precursor to the newly received sub-sequence; and
performing an automatic action to prevent the predicted anomaly.

7. The method of claim 6, wherein the automatic action includes an action selected from the group consisting of sounding an alarm, locking doors, engaging or disengaging traffic control devices, changing the operational status of one or more machines, triggering an environmental control, and triggering a fire suppression system.

8. The method of claim 6, further comprising saving the identified anomaly in a precursor database.

9. The method of claim 8, further comprising generating the newly generated sub-sequence from new time series information, wherein matching the identified anomaly precursor to the newly received sub-sequence includes determining a similarity between the newly generated sub-sequence to each identified anomaly in the precursor database.

10. A system for detecting and responding to an anomaly, comprising:
a hardware processor;
a memory that stores a computer program product, which, when executed by the hardware processor, causes the hardware processor to:
process frames of a video stream to determine values of a feature corresponding to each frame;
generate a feature time series that corresponds to values of the identified feature over time;
determine a matrix profile that identifies similarities of sub-sequences of the time series to other sub-sequences of the feature time series, wherein the matrix profile includes a matrix having elements that each represent a similarity between a respective pair of sub-sequences of the time series and further includes a profile time series having values that correspond to each sub-sequence of the feature time series and that are determined by the most similar other sub-sequence of the feature time series;
detect an anomaly by determining that a value of the matrix profile exceeds a threshold value; and
perform an automatic action responsive to the detected anomaly.

11. The system of claim 10, wherein the computer program product further causes the hardware processor to perform object detection.

12. The system of claim 11, wherein the feature time series includes a number of detected objects at each frame.

13. The system of claim 10, wherein the computer program product further causes the hardware processor to update the feature time series and the matrix profile in response to newly received frames of the video stream.

14. The system of claim 10, wherein the automatic action includes an action selected from the group consisting of sounding an alarm, locking doors, engaging or disengaging traffic control devices, changing the operational status of one or more machines, triggering an environmental control, and triggering a fire suppression system.

* * * * *